United States Patent
Jha et al.

(10) Patent No.: US 12,367,131 B2
(45) Date of Patent: *Jul. 22, 2025

(54) SYSTEMS AND METHODS FOR CONNECTION SWITCH AUTOMATION

(71) Applicant: Truist Bank, Charlotte, NC (US)

(72) Inventors: Sanjeev Kumar Jha, Marietta, GA (US); Tekchand Prasad, Alpharetta, GA (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,723

(22) Filed: Jun. 18, 2024

(65) Prior Publication Data

US 2024/0338305 A1    Oct. 10, 2024

Related U.S. Application Data

(63) Continuation of application No. 18/074,012, filed on Dec. 2, 2022, now Pat. No. 12,045,157.

(51) Int. Cl.
  *G06F 11/00* (2006.01)
  *G06F 9/445* (2018.01)
  *G06F 11/3698* (2025.01)
  *G06Q 20/02* (2012.01)

(52) U.S. Cl.
  CPC ...... *G06F 11/3698* (2025.01); *G06F 9/44505* (2013.01); *G06Q 20/023* (2013.01)

(58) Field of Classification Search
  CPC ............. G06F 11/3698; G06F 11/3664; G06F 9/45505

USPC ....................................................... 714/1–57
  See application file for complete search history.

(56) References Cited

U.S. PATENT DOCUMENTS

| | | | |
|---|---|---|---|
| 2005/0081080 A1* | 4/2005 | Bender | H04L 41/0668 714/2 |
| 2007/0248936 A1 | 10/2007 | Huff | |
| 2009/0316587 A1 | 12/2009 | Omar | |
| 2018/0310051 A1 | 10/2018 | Zabetian | |
| 2019/0318329 A1 | 10/2019 | Castinado | |
| 2021/0216526 A1 | 7/2021 | Barrett | |
| 2022/0269583 A1 | 8/2022 | Zaleski | |
| 2022/0269586 A1* | 8/2022 | Zaleski | G06F 11/3688 |

* cited by examiner

*Primary Examiner* — Sarai E Butler
(74) *Attorney, Agent, or Firm* — Kilpatrick Townsend & Stockton LLP; Michael A. Springs, Esq.

(57) ABSTRACT

A system includes a processing device and a memory device that includes instructions executable by the processing device for causing the processing device to perform operations. The operations include receiving a first configuration update of a first interaction event. The operations further include automatically switching a test channel connection with an interaction processing environment, using the first configuration update of the first interaction event, to generate a first switched channel connection with the interaction processing environment. Additionally, the operations include, in response to establishing the first switched channel connection, facilitating a first validation operation of the first configuration update using the first switched channel connection with the interaction processing environment. Further, the operations include, in response to validating the first configuration update, implementing the first configuration update in an interaction production environment.

20 Claims, 5 Drawing Sheets

SYSTEMS AND METHODS FOR CONNECTION SWITCH AUTOMATION

CROSS-REFERENCE TO RELATED APPLICATIONS

This is a continuation of U.S. patent application Ser. No. 18/074,012, filed Dec. 2, 2022, entitled "SYSTEMS AND METHODS FOR CONNECTION SWITCH AUTOMATION", the entirety of which is incorporated herein by reference.

TECHNICAL FIELD

The present disclosure relates generally to interprocess communications and, more particularly (although not necessarily exclusively), to automatically switching communication connections between channels.

BACKGROUND

In some examples, a processing network may test configuration changes to validate functionality of new or updated instructions, such as through sprint testing. Some interprocess communication networks may include limited testing channels available for testing the configuration changes. For example, only a single testing channel may be available to perform the functionality validation. Further, each time the configuration is tested for a separate channel of the processing network, a development team member may be required to perform several steps to adjust the communication channel of the processing network to perform the functionality validation. The manual adjustment of the communication channel may involve updating portions of source code to reflect the configuration changes, recompiling the source code, deploying the recompiled source code in relevant environments; and validating the changes all prior to performing the actual functionality testing on the configuration changes. After a test is performed, the process may be repeated each time a new set of configuration changes are desired. Such a process may be prohibitively expensive in terms of man-hours, computing resources, and user downtime.

SUMMARY

In one example, a system includes a processing device and a memory device that includes instructions executable by the processing device for causing the processing device to perform operations. The operations include receiving a first configuration update of a first interaction event. The operations further include automatically switching a test channel connection with an interaction processing environment, using the first configuration update of the first interaction event, to generate a first switched channel connection with the interaction processing environment. Additionally, the operations include, in response to establishing the first switched channel connection, facilitating a first validation operation of the first configuration update using the first switched channel connection with the interaction processing environment. Further, the operations include, in response to validating the first configuration update, implementing the first configuration update in an interaction production environment.

In another example, a computer-implemented method includes receiving a first configuration update of a first interaction event. The method also includes automatically switching a test channel connection with an interaction processing environment, using the first configuration update of the first interaction event, to generate a first switched channel connection with the interaction processing environment. Additionally, the method includes, in response to establishing the first switched channel connection, facilitating a first validation operation of the first configuration update using the first switched channel connection with the interaction processing environment. Further, the method includes, in response to validating the first configuration update, implementing the first configuration update in an interaction production environment.

In another example, a non-transitory computer-readable medium includes instructions that are executable by a processing device for performing operations. The operations include receiving a first configuration update of a first interaction event. The operations further include automatically switching a test channel connection with an interaction processing environment, using the first configuration update of the first interaction event, to generate a first switched channel connection with the interaction processing environment. Additionally, the operations include, in response to establishing the first switched channel connection, facilitating a first validation operation of the first configuration update using the first switched channel connection with the interaction processing environment. Further, the operations include, in response to validating the first configuration update, implementing the first configuration update in an interaction production environment.

DETAILED DESCRIPTION

Certain aspects and examples of the present disclosure relate to a system and method for performing connection switch automation for a processing network. The processing network may include a system to facilitate interprocess communications between computing systems. In an example, one computing system may provide limited communication channels for another computing system to test and validate configuration changes associated with a number of environments used in the interprocess communications. Further, each of the environments may have their own configuration changes that may result in significant, complicated updates to the architecture of the environments.

Because of the complicated nature of the updates to the architecture, and a significant amount of manual intervention used to perform the updates, an automation scheme used to perform environment connection switching between two or more computing systems may be beneficial. For example, the automatic nature of the connection switching may limit human error in the configuration updates and may automate tedious tasks that are also prone to error. Further, limited manual oversight may be employed to ensure that the connection switching for the interprocess communications occurs successfully.

In some examples, the environment connection switching may be employed automatically in a predefined series. For example, a simulator of one computing device, which may be employed to emulate an actual computing device with limited communication channels when those communication channels are not available, may initially test and validate a configuration change. Prior to implementing the configuration change from a testing environment to a production environment at one of the computing systems, the configuration change may also be validated in the testing environment at the computing system upon successful completion of the simulation validation. In such an example, the validation at the testing environment at the computing system may be performed automatically upon the successful completion of the simulation validation. Further, in some examples, the updated configuration may be implemented in the production environment upon successful validation in the testing environment at the computing device.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
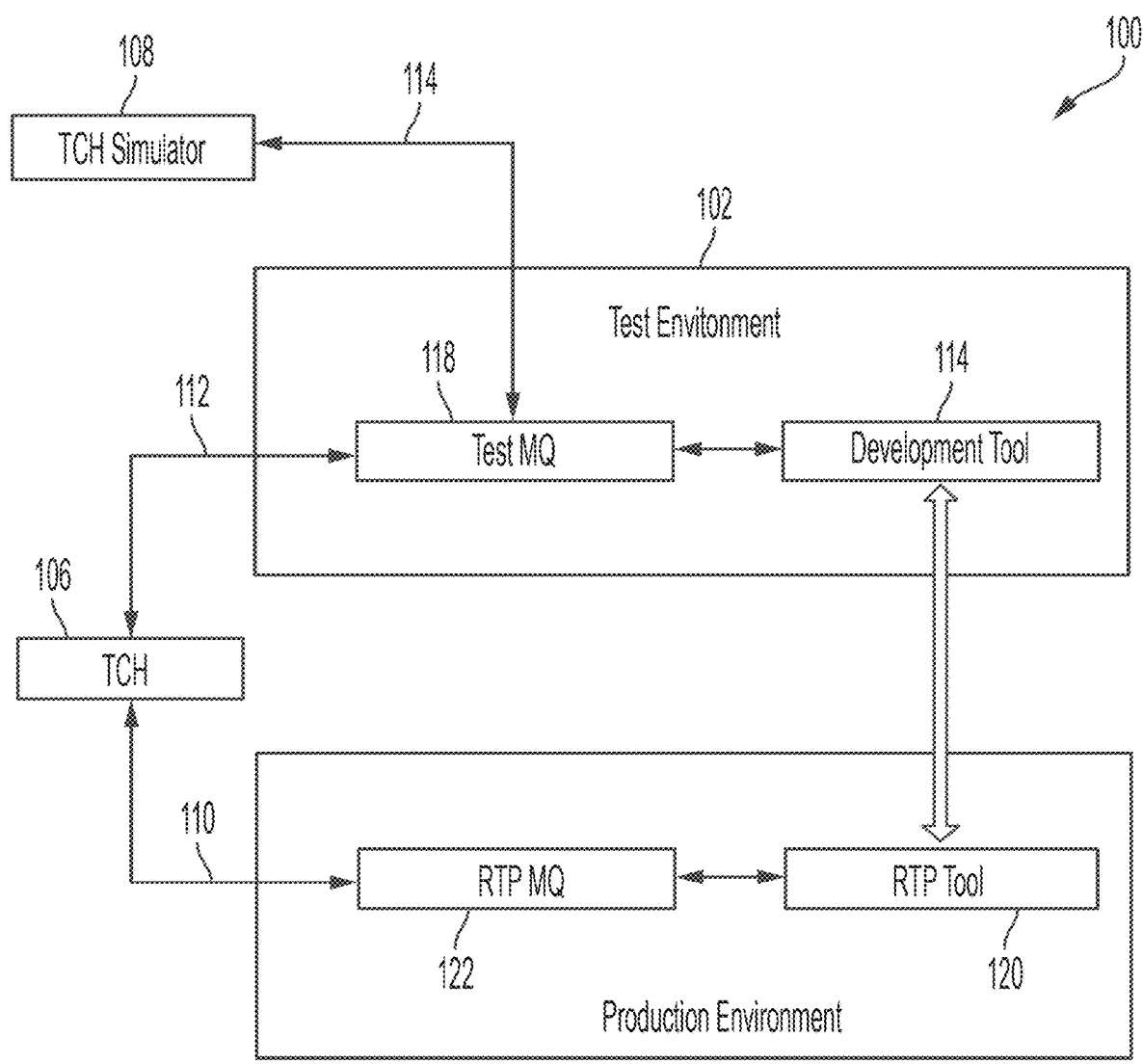
FIG. 1 is a schematic of an example of a processing network that can perform communication switching, according to one example of the present disclosure.

FIG. 1 is a schematic of an example of a processing network 100 that can perform communication switching, according to one example of the present disclosure. In an example, the processing network 100 can include a test environment 102, a production environment 104, an interaction processing environment 106, and an interaction processing environment simulator 108. The interaction processing environment 106 may, in some examples, be a transaction clearinghouse (TCH), and the simulator 108 may be a simulator of the TCH. The interaction processing environment 106, in some examples, may process interaction events, such as real-time payments (RTPs) from a bank, for example. RTPs include electronic payments between parties that are initiated and settled in near real time at any time of day and on any day of the week. Because RTPs are performed in substantially real time, the interaction processing environment 106 may rely upon validated features of the production environment 104. For example, the production environment 104 may include validated safety and security features that the interaction processing environment 106 relies upon to facilitate real-time transactions.

In an example, the interaction processing environment 106 may provide limited communication channels 110 and 112 to other computing systems. For example, the interaction processing environment 106 may provide only a single production channel 110 between the interaction processing environment 106 and the production environment 104. Further, the interaction processing environment 106 may also provide only a single testing channel 112 between the interaction processing environment 106 and the test environment 102. In an example, the test environment 102 and the production environment 104 may both be part of a same entity, such as a bank. In some examples, the test environment 102 and the production environment 104 may be executed in the same computing system, or the test environment 102 and the production environment 104 may be executed in separate or distributed computing systems.

Due to the limited communication channels available for the test environment 102 and the production environment 104, the interaction processing environment simulator 108 may be employed by the test environment 102 to perform testing and validation operations for configuration changes generated by a development tool 114 associated with interaction events. Communication between the test environment 102 and the interaction processing environment simulator 108 may be by way of a simulator channel 116. The configuration changes may include connection changes for outgoing messages to the interaction processing environment 106, connection changes for incoming messages from the interaction processing environment 106, signature changes, flag changes, message queue connection changes for API calls, or any other configuration changes implemented by the development tool 114.

The development tool 114 may automatically perform connection switching between the channels 112 and 116 and a test message queue 118 of the test environment 102. For example, the development tool 114 may automatically switch between the channels 112 and 116 based on the configuration changes and, in some examples, validated results of the configuration changes.

Once configuration changes are validated for functionality at the interaction processing environment 106, the development tool 114 may provide instructions to an RTP tool 120 such that the configuration changes can be implemented at the production environment 104. In such an example, the RTP tool 120 may enable RTP transactions through an RTP message queue 122 and across the production channel 110 to the interaction processing environment 106 when the RTP transactions are defined by the newly implemented configuration changes.

Figure 2:
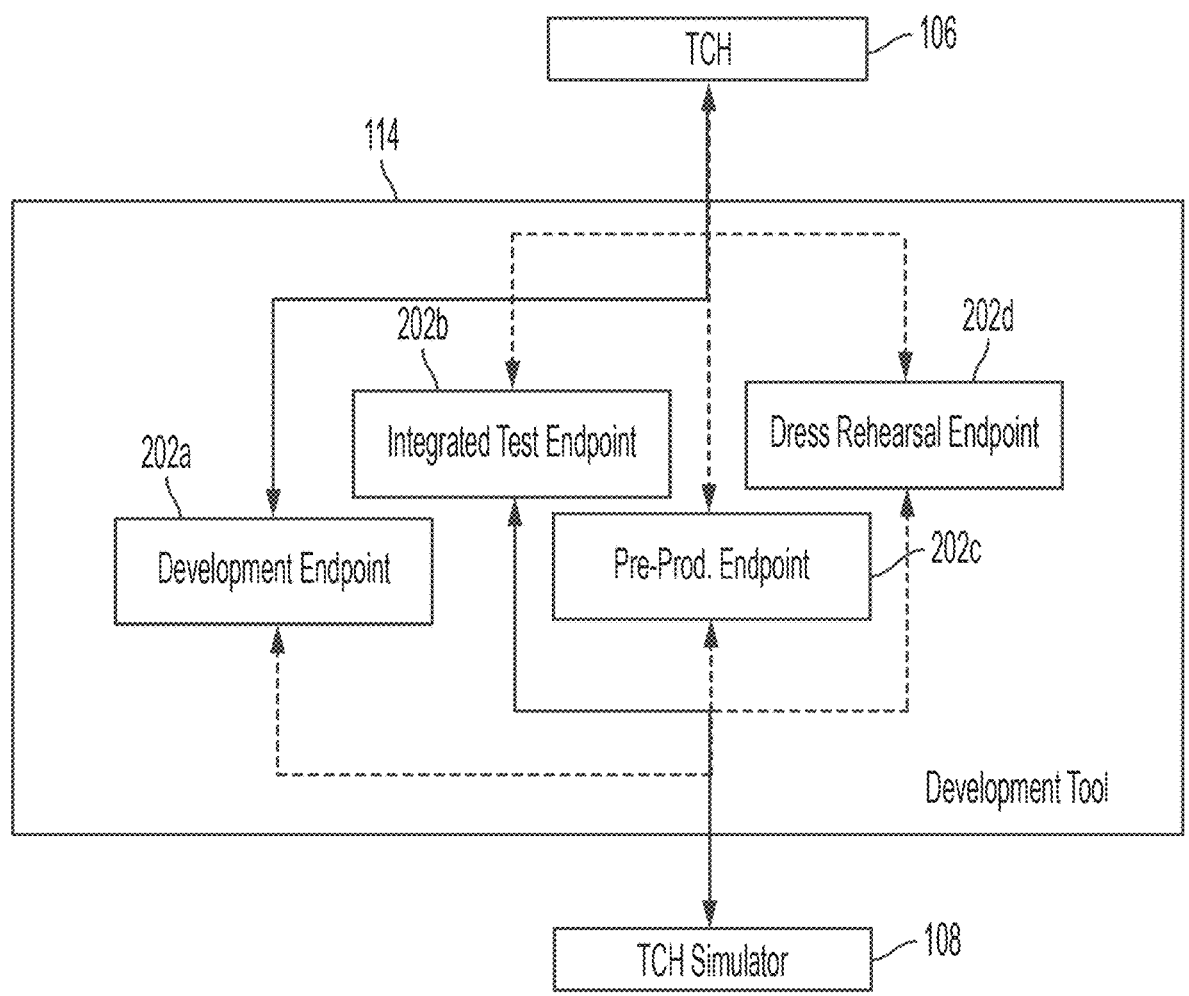
FIG. 2 is a block diagram of an example of a development tool used to perform the communication switching, according to one example of the present disclosure.

FIG. 2 is a block diagram of an example of the development tool 114 used to perform the communication switching, according to one example of the present disclosure. In an example, the development tool 114 may be implemented using SOAPUI or Postman user interface environments (e.g., a Uniform Resource Locator (URL) user interface environment). For example, the development tool 114 may access application code for the configuration changes through a URL. Using the development tool 114, the URL can be modified by changing different flags for different features that can be tested. The flags, in an example, may be true or false values for a particular feature. For example, the flags may designate One View, Digital Treasury, or XNX as a specific environment for the configuration changes. In an example, One View may represent a commercial banking environment of a bank, Digital Treasury may represent a cash management environment for commercial and corporate customers of a bank, and XNX may represent a WebSphere Transformation Extender pack for Electronic Data Interchange. In an example, the XNX is a tool that may be used for file transformation, such as to debulk a file, to transform a file to individual payment instructions, to map data from one format to another, etc. Within those environments, various pre-established flags may be selected to specify individual configuration changes. In an example, the configuration changes may include connection changes for outgoing messages to the interaction processing environment 106, connection changes for incoming messages from the interaction processing environment 106, signature changes, message queue connection changes for API calls, or any other configuration changes available to the development tool 114. In some examples, the development tool 114 may provide a list of configuration changes available for testing with the interaction processing environment 106, the interaction processing environment simulator 108, or both.

Because written configuration changes can be reduced to flag changes (e.g., true/false toggles or on/off switches), the development tool 114 is able to avoid inadvertent code errors associated with hand-written changes. Further, the effort involved with generating the hand-written changes may be distilled to simple point-and-select operations within the development tool 114. Thus, computing resource consumption that accompanies code debugging or error corrections may be avoided, and the time associated with the actual application of a configuration change for testing may be also avoided.

In an example, the development tool 114 may include several testing endpoints 202*a-d* that are used to validate the configuration changes. Because the interaction processing environment 106 may include a limited number of communication channels, the configuration of the development tool 114 may be limited to an individual endpoint 202 at a time. For example, the configuration changes may be different as the development tool 114 progresses testing from a development endpoint 202*a*, to an integrated test endpoint 202*b*, to a pre-production endpoint 202*c*, and to a dress rehearsal endpoint 202*d*. Accordingly, a new connection between the test message queue 118 and the interaction processing environment 106 or the interaction processing environment simulator 108 may be generated each time an endpoint is changed during a validation cycle of a new feature in development. In an example, the development tool 114 may simplify the progression and connection switch by defining the different endpoints in SOAPUI or Postman as a flag change. That is, instead of replacing sections of code to connection switch between the development endpoint 202*a* and the integrated test endpoint 202*b* and subsequently recompiling the code, the connection switch between may be established simply by changing a flag of the development endpoint 202*a* from true to false and the flag of the integrated test endpoint 202*b* from false to true. Other configuration changes relevant to generating a connection switch between the interaction processing environment 106 or the interaction processing environment simulator 108 and the test message queue 118 may also be performed in a similar manner.

Figure 3:
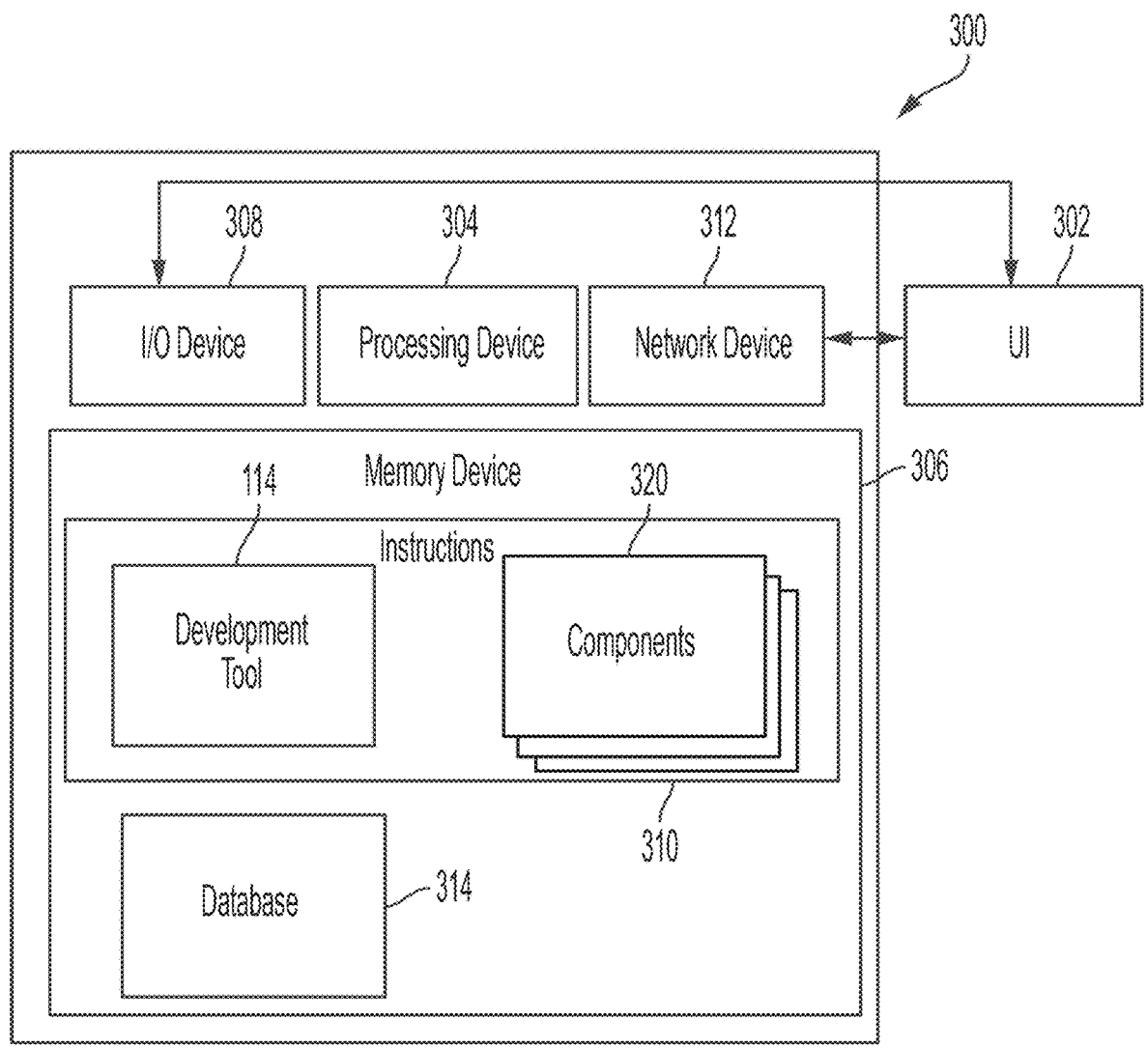
FIG. 3 is a block diagram of a computing device capable of implementing communication switching techniques, according to one example of the present disclosure.

FIG. 3 is a block diagram of an example of a computing system 300 capable of implementing communication switching techniques, according to one example of the present disclosure. The computing system 300 includes a processing device 304 that is communicatively coupled to a memory device 306. In some examples, the processing device 304 and the memory device 306 can be part of the same computing device, such as the computing system 300. In other examples, the processing device 304 and the memory device 306 can be distributed from (e.g., remote to) one another. For instance, the memory device 306 may be hosted by a cloud storage provider.

The processing device 304 can include one processor or multiple processors. Non-limiting examples of the processing device 304 include a Field-Programmable Gate Array (FPGA), an application-specific integrated circuit (ASIC), or a microprocessor. The processing device 304 can execute instructions 310 stored in the memory device 306 to perform operations. The instructions 310 may include processor-specific instructions generated by a compiler or an interpreter from code written in any suitable computer-programming language, such as C, C++, C#, Java, or Python.

The memory device 306 can include one memory or multiple memories. The memory device 306 can be volatile or non-volatile. Non-volatile memory includes any type of memory that retains stored information when powered off. Examples of the memory device 306 include electrically erasable and programmable read-only memory (EEPROM) or flash memory. At least some of the memory device 306 can include a non-transitory computer-readable medium from which the processing device 304 can read instructions 310. A non-transitory computer-readable medium can include electronic, optical, magnetic, or other storage devices capable of providing the processing device 304 with computer-readable instructions or other program code. Examples of a non-transitory computer-readable medium can include a magnetic disk, a memory chip, ROM, random-access memory (RAM), an ASIC, a configured processor, and optical storage.

The processing device 304 may also be communicatively coupled to an I/O device 308 for displaying, for example, a user interface that may be operated to configure the computing system 300. The I/O device 308 may also include any suitable device for configuring the computing system 300, for instance, a keyboard or mouse. The processing device 304 may also be communicatively coupled to a network device 312 for communicating with and among other devices in the computing system 300 over a network. In some examples, the network device 312 is a network interface card. In other examples, the network device 312 may be a virtual network interface implemented in software. The network may include all or part of multiple networks, including the Internet, a LAN, a WAN, wireless network, cellular network, or the like.

The processing device 304 can execute the instructions 310 to perform operations. The instructions 310 may include program code for operating the development tool 114 and one or more components 320 of the test environment 102 and the production environment 104. In some examples, the one or more components 320 may also be part of the interaction processing environment simulator 108. For example, in accordance with the example from FIG. 1, the processing device 304 can receive, via the network device 312 or the I/O device 308, a connection switch request from a user interface 302. The development tool 114 may generate, using the processing device 304, an updated configuration to switch a connection between the test environment 102 and the TCH simulator 108. The development tool 114 may then implement the updated configuration between the test environment 102 and the TCH simulator 108. The development tool 114 may store in a database 314, or other suitable memory device 306, the updated configuration associated with the connection switch.

Figure 4:
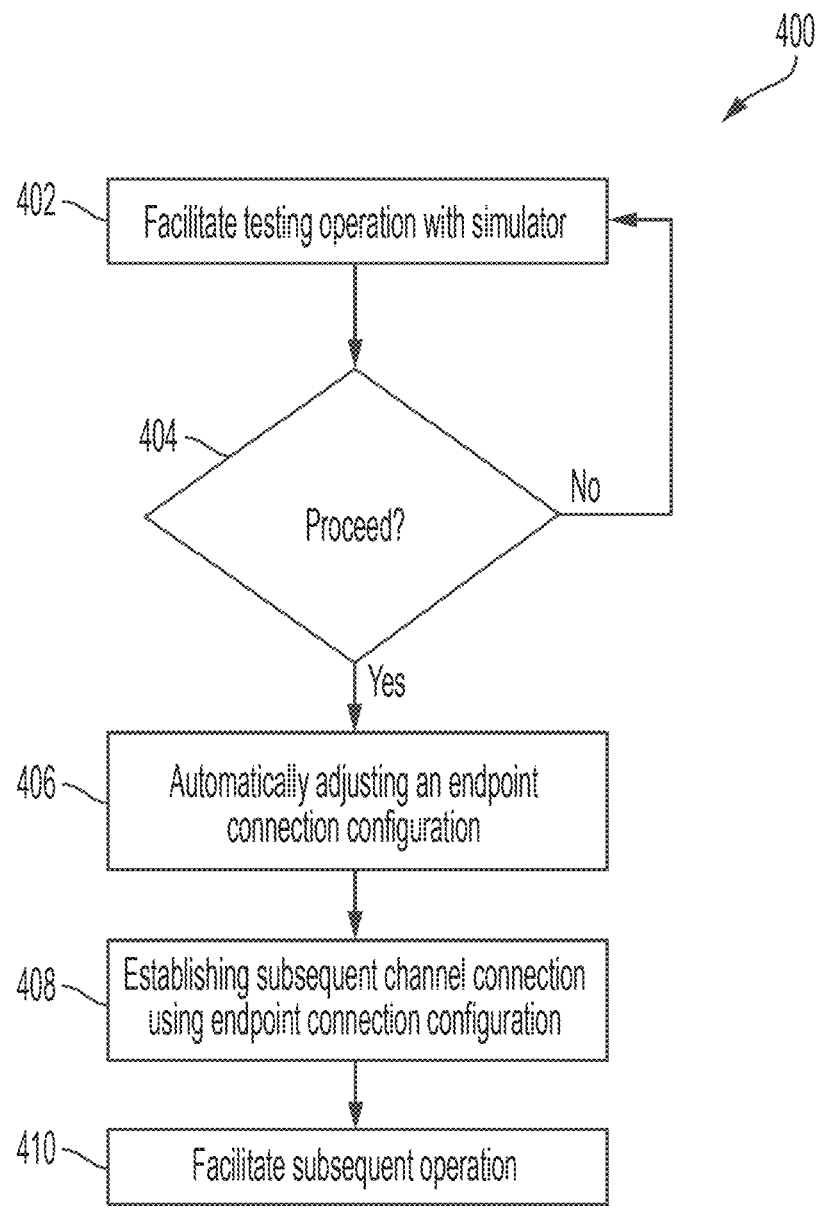
FIG. 4 is a flowchart of a process for performing communication switching in a processing network, according to one example of the present disclosure.

FIG. 4 is a flowchart of a process 400 for performing communication switching in a processing network, according to one example of the present disclosure. In some examples, the processing device 304 can implement some or all of the blocks shown in FIG. 4. Other examples can include more blocks, fewer blocks, different blocks, or a different order of the blocks than is shown in FIG. 4. The blocks of FIG. 4 are discussed below with reference to the components discussed above in relation to FIGS. 1-3.

At block 402, the processing device 304 can facilitate a testing operation with the interaction processing environment simulator 108. As discussed above with respect to FIG. 1, configuration changes for various interactions processed by the interaction processing environment 106 may be validated for functionality with the interaction processing environment 106 before the configuration changes can be applied to the production environment 104. Because the interaction processing environment 106 may provide only an individual testing channel 112 for the test environment 102, the interaction processing environment simulator 108 may provide an additional avenue for initial validation of a configuration change.

At block 404, the processing device 304 can determine if a validation process is able to proceed. For example, the interaction processing environment simulator 108 may provide an indication of whether the configuration change produced results that are sufficient for implementation in the production environment 104. If the interaction processing environment simulator 108 did not produce adequate results, then the configuration change may be updated and retested at block 402.

If the interaction processing environment simulator 108 did provide an indication that the configuration change produced adequate results, then, at block 406, the processing device 304 may automatically adjust an endpoint connection configuration. As discussed above with respect to FIG. 2, the endpoints 202 may represent various stages of a validation process. When a particular endpoint 202 is successfully validated, the validation process may proceed to a subsequent endpoint. For example, upon successfully validating the development endpoint 202a, the validation process may proceed to validating the integrated test endpoint 202b, and so on. In an example, the development tool 114 may adjust a flag of a URL user interface to transition from one development endpoint 202 to another.

At block 408, the processing device 304 may establish a subsequent channel connection using the endpoint connection configuration. As the updated endpoint connection configuration is efficiently implemented without a recompiling requirement, the processing device 304 may efficiently update the channel connection for the updated endpoint 202.

At block 410, the processing device 304 can facilitate a subsequent validation operation at the interaction processing environment simulator 108 for the updated endpoint 202. For example, the processing device 304 may perform blocks 402-408 on the updated endpoint. The process 400 may repeat until a validation process for an updated configuration is complete.

Figure 5:
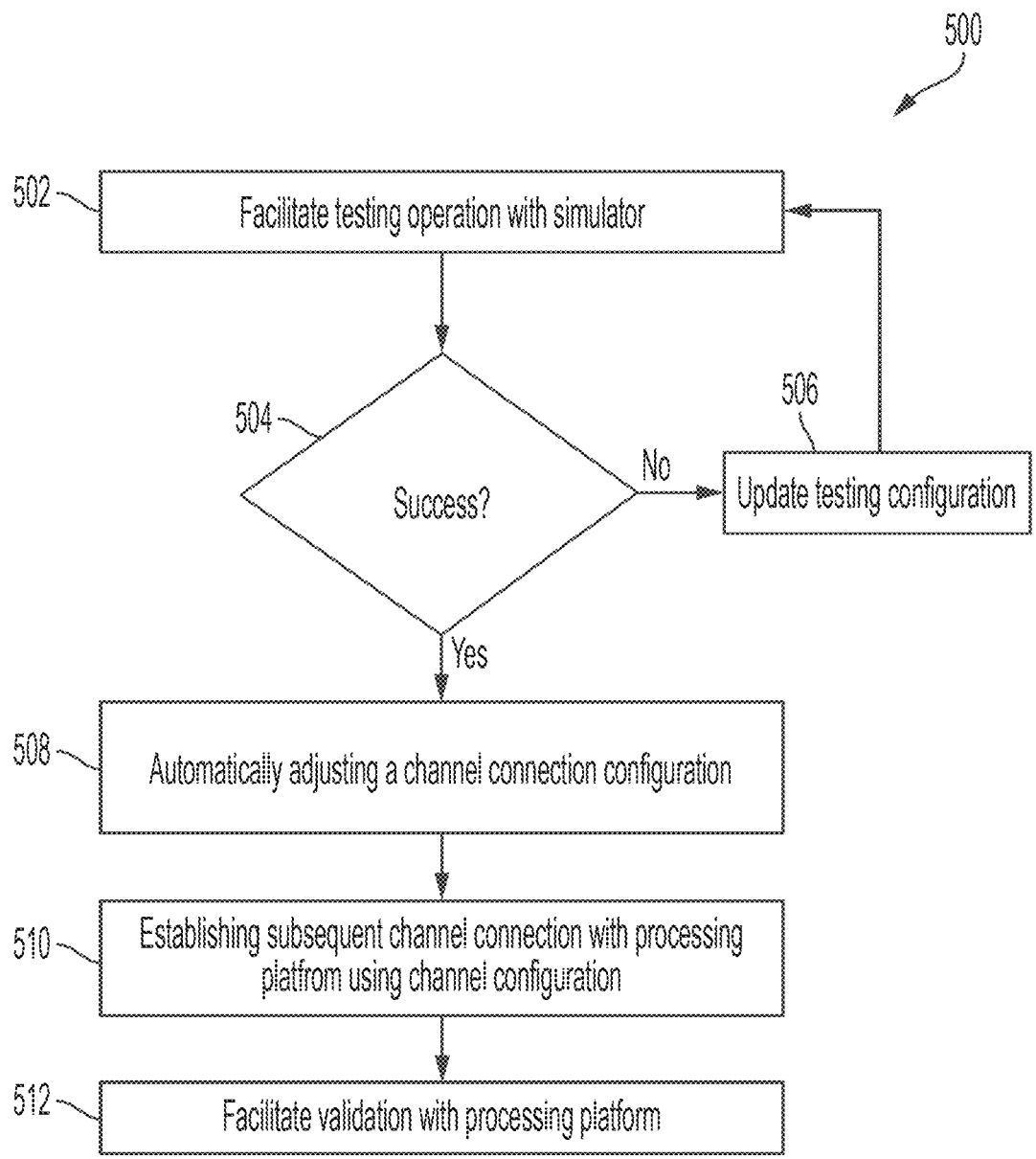
FIG. 5 is a flowchart of an additional process for performing communication switching in a processing network, according to one example of the present disclosure.

FIG. 5 is a flowchart of an additional process 500 for performing communication switching in a processing network, according to one example of the present disclosure. In some examples, the processing device 304 can implement some or all of the blocks shown in FIG. 5. Other examples can include more blocks, fewer blocks, different blocks, or a different order of the blocks than is shown in FIG. 5. The blocks of FIG. 5 are discussed below with reference to the components discussed above in relation to FIGS. 1-3.

At block 502, the processing device 304 can facilitate a testing operation with the interaction processing environment simulator 108. As discussed above with respect to FIG. 1, configuration changes for various interactions processed by the interaction processing environment 106 may be validated for functionality with the interaction processing environment 106 before the configuration changes are applied to the production environment 104. Because the interaction processing environment 106 may provide only an individual testing channel 112 for the test environment 102, the interaction processing environment simulator 108 may provide an additional avenue for initial validation of a configuration change.

At block 504, the processing device 304 can determine if a validation process is successful. For example, the development tool 114 may determine if there are any additional endpoints 202 or other testing configurations for a particular update that should be validated. If the processing device 304 determines that the validation process is not yet successful, then, at block 506, the processing device 304 may update the testing configuration at block 506 and retest the updated testing configuration at block 502. This iterative process may repeat until the processing device 304, at block 504, determines that the validation process is successful or until the validation process is stopped for any reason.

If the development tool 114 did provide an indication that the validation process was successful, then, at block 506, the processing device 304 may automatically adjust a channel connection configuration. For example, upon completion of the validation process at the interaction processing environment simulator 108, the development tool 114 may update a flag such that the communication channel automatically switches to the interaction processing environment 106 for final validation at the interaction processing environment 106 itself.

At block 510, the processing device 304 may establish a subsequent channel connection with the interaction processing environment 106 using the updated channel connection configuration. As the updated channel connection configuration is efficiently implemented without a recompiling requirement, the processing device 304 may efficiently update the channel connection for the updated endpoint 202.

At block 512, the processing device 304 can facilitate a subsequent validation operation at the interaction processing environment 106. Upon completion of the validation operation at the interaction processing environment 106, the development tool 114 may implement the validated configuration changes in the production environment 104. In such an example, the features associated with the configuration changes may be available for interaction processing by the interaction processing environment 106. For example, a particular real-time payment configuration defined by the configuration changes may be available for processing by the interaction processing environment 106.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory device that includes instructions executable by the processing device for causing the processing device to perform operations comprising:
      automatically switching, using a first configuration update of a first interaction event, a test channel connection with an interaction processing environment;
      facilitating a first validation operation of the first configuration update using a first switched channel connection with the interaction processing environment; and
      automatically switching, using a second configuration update of a second interaction event, the test channel connection with the interaction processing environment to generate a second switched channel connection with the interaction processing environment, wherein generating the second switched channel connection comprises switching from the first switched channel connection to the second switched channel connection, and wherein switching from the first switched channel connection to the second switched channel connection comprises changing one or more flags in a Uniform Resource Locator (URL) user interface environment.

2. The system of claim 1, wherein the interaction processing environment comprises a simulator configured to simulate a real-time payment clearinghouse.

3. The system of claim 2, wherein the operations further comprise using, by simulating the real-time payment clearinghouse, the first configuration update of the first interaction event to generate the first switched channel connection with the interaction processing environment.

4. The system of claim 1, wherein the operations further comprise, in response to validating the first configuration update, implementing the first configuration update in an interaction production environment.

5. The system of claim 4, wherein the interaction production environment comprises a production channel connection with the interaction processing environment.

6. The system of claim 4, wherein the interaction processing environment comprises a real-time payment clearinghouse simulator, and wherein the interaction production environment comprises a real-time payment clearinghouse.

7. The system of claim 1, wherein the operations further comprise, in response to establishing the second switched channel connection, facilitating a second validation operation of the second configuration update using the second switched channel connection with the interaction processing environment.

8. A computer-implemented method comprising:
automatically switching, using a first configuration update of a first interaction event, a test channel connection with an interaction processing environment;
facilitating a first validation operation of the first configuration update using a first switched channel connection with the interaction processing environment; and
automatically switching, using a second configuration update of a second interaction event, the test channel connection with the interaction processing environment to generate a second switched channel connection with the interaction processing environment, wherein generating the second switched channel connection comprises switching from the first switched channel connection to the second switched channel connection, and wherein switching from the first switched channel connection to the second switched channel connection comprises changing one or more flags in a Uniform Resource Locator (URL) user interface environment.

9. The computer-implemented method of claim 8, wherein the interaction processing environment comprises a simulator configured to simulate a real-time payment clearinghouse.

10. The computer-implemented method of claim 9, further comprising using, by simulating the real-time payment clearinghouse, the first configuration update of the first interaction event to generate the first switched channel connection with the interaction processing environment.

11. The computer-implemented method of claim 8, further comprising, in response to validating the first configuration update, implementing the first configuration update in an interaction production environment.

12. The computer-implemented method of claim 11, wherein the interaction production environment comprises a production channel connection with the interaction processing environment.

13. The computer-implemented method of claim 11, wherein the interaction processing environment comprises a real-time payment clearinghouse simulator, and wherein the interaction production environment comprises a real-time payment clearinghouse.

14. The computer-implemented method of claim 8, further comprising, in response to establishing the second switched channel connection, facilitating a second validation operation of the second configuration update using the second switched channel connection with the interaction processing environment.

15. A non-transitory computer-readable medium comprising instructions that are executable by a processing device for causing the processing device to perform operations comprising:
automatically switching, using a first configuration update of a first interaction event, a test channel connection with an interaction processing environment;
facilitating a first validation operation of the first configuration update using a first switched channel connection with the interaction processing environment; and
automatically switching, using a second configuration update of a second interaction event, the test channel connection with the interaction processing environment to generate a second switched channel connection with the interaction processing environment, wherein generating the second switched channel connection comprises switching from the first switched channel connection to the second switched channel connection, and wherein switching from the first switched channel connection to the second switched channel connection comprises changing one or more flags in a Uniform Resource Locator (URL) user interface environment.

16. The non-transitory computer-readable medium of claim 15, wherein the interaction processing environment comprises a simulator configured to simulate a real-time payment clearinghouse, and wherein the operations further comprise using, by simulating the real-time payment clearinghouse, the first configuration update of the first interaction event to generate the first switched channel connection with the interaction processing environment.

17. The non-transitory computer-readable medium of claim 15, wherein the operations further comprise, in response to validating the first configuration update, implementing the first configuration update in an interaction production environment.

18. The non-transitory computer-readable medium of claim 17, wherein the interaction production environment comprises a production channel connection with the interaction processing environment.

19. The non-transitory computer-readable medium of claim 17, wherein the interaction processing environment comprises a real-time payment clearinghouse simulator, and wherein the interaction production environment comprises a real-time payment clearinghouse.

20. The non-transitory computer-readable medium of claim 15, wherein the operations further comprise, in response to establishing the second switched channel connection, facilitating a second validation operation of the second configuration update using the second switched channel connection with the interaction processing environment.

* * * * *